United States Patent
Ciabrini et al.

(10) Patent No.: US 9,235,620 B2
(45) Date of Patent: Jan. 12, 2016

(54) UPDATING CACHED DATABASE QUERY RESULTS

(75) Inventors: Damien Ciabrini, Magagnosc (FR); Guillaume Legrand, Grasse (FR); Benoit Janin, Biot (FR); Luc Isnardy, Cagnes sur Mer (FR); Nicolas Maillot, Biot (FR); Charles-Antoine Robelin, Antibes (FR); Rudy Daniello, Nice (FR)

(73) Assignee: Amadeus S.A.S., Biot (FR)

( * ) Notice: Subject to any disclaimer, the term of this patent is extended or adjusted under 35 U.S.C. 154(b) by 66 days.

(21) Appl. No.: 13/585,286

(22) Filed: Aug. 14, 2012

(65) Prior Publication Data

US 2014/0052750 A1 Feb. 20, 2014

(51) Int. Cl.
*G06F 17/30* (2006.01)
*G06Q 10/02* (2012.01)

(52) U.S. Cl.
CPC .......... *G06F 17/3048* (2013.01); *G06Q 10/02* (2013.01)

(58) Field of Classification Search
USPC ......................................................... 707/948
See application file for complete search history.

(56) References Cited

U.S. PATENT DOCUMENTS

| | | | |
|---|---|---|---|
| 4,360,875 A | 11/1982 | Behnke | |
| 4,862,357 A | 8/1989 | Ahlstrom et al. | |
| 5,495,606 A | 2/1996 | Borden et al. | |
| 5,822,747 A | 10/1998 | Graefe et al. | |
| 5,924,090 A | 7/1999 | Krellenstein | |
| 6,067,541 A | 5/2000 | Raju et al. | |
| 6,122,642 A | 9/2000 | Mehovic | |
| 6,392,997 B1 | 5/2002 | Chen | |
| 7,050,986 B1 | 5/2006 | Vance et al. | |
| 7,254,580 B1 * | 8/2007 | Gharachorloo et al. | |
| 7,437,408 B2 | 10/2008 | Schwartz et al. | |
| 7,454,462 B2 | 11/2008 | Belfiore et al. | |

(Continued)

FOREIGN PATENT DOCUMENTS

| | | |
|---|---|---|
| CN | 101187946 A | 5/2008 |
| EP | 1643388 A1 | 4/2006 |

(Continued)

OTHER PUBLICATIONS

European Search Report for European Patent Application No. 11305518 dated Sep. 15, 2011.

(Continued)

*Primary Examiner* — James E Richardson
(74) *Attorney, Agent, or Firm* — Thompson Hine LLP

(57) ABSTRACT

A data cache platform maintains pre-computed database query results computed by a computation platform based on data maintained in the computation platform and is configured to determine probabilities of the cached database query results being outdated, to automatically issue re-computation orders to the computation platform for updating cached database query results on the basis of the determined probabilities of the pre-computed database query results being outdated and to receive the updated pre-computed database query results as results of the re-computation orders. The probability determination depends on a probabilistic model and on the occurrence of asynchronous real-time events. The real-time events are indeterministic with regard to the expiration of the cached database query results and only have a probabilistic influence on the discrepancies between the cached database query results maintained in the data cache platform and presumed actual database query results.

20 Claims, 6 Drawing Sheets

(56) References Cited

U.S. PATENT DOCUMENTS

| | | | |
|---|---|---|---|
| 7,454,761 | B1 | 11/2008 | Roberts et al. |
| 7,512,652 | B1 | 3/2009 | Appelman et al. |
| 7,725,655 | B2 * | 5/2010 | Frolund et al. ............... 711/119 |
| 7,778,962 | B2 | 8/2010 | Shah et al. |
| 7,890,461 | B2 | 2/2011 | Oeda et al. |
| 7,925,624 | B2 | 4/2011 | Vosshall et al. |
| 2002/0078045 | A1 | 6/2002 | Dutta |
| 2002/0078150 | A1 | 6/2002 | Thompson et al. |
| 2002/0143933 | A1 | 10/2002 | Hind et al. |
| 2003/0004760 | A1 | 1/2003 | Schiff et al. |
| 2003/0023715 | A1 | 1/2003 | Reiner et al. |
| 2003/0195959 | A1 | 10/2003 | Labadie et al. |
| 2003/0200194 | A1 | 10/2003 | Arnold et al. |
| 2003/0225888 | A1 | 12/2003 | Wason |
| 2003/0233473 | A1 | 12/2003 | Bonhomme et al. |
| 2004/0006625 | A1 | 1/2004 | Saha et al. |
| 2004/0006711 | A1 | 1/2004 | Krishnaswamy et al. |
| 2004/0078251 | A1 | 4/2004 | DeMarcken |
| 2004/0249799 | A1 * | 12/2004 | Demarcken et al. ............. 707/3 |
| 2004/0267623 | A1 | 12/2004 | Vivadelli et al. |
| 2005/0008163 | A1 | 1/2005 | Leser et al. |
| 2005/0026103 | A1 | 2/2005 | Wasylucha |
| 2005/0108069 | A1 | 5/2005 | Shiran et al. |
| 2005/0108298 | A1 | 5/2005 | Iyengar et al. |
| 2005/0262100 | A1 | 11/2005 | Piper |
| 2006/0155857 | A1 | 7/2006 | Feenan et al. |
| 2006/0212583 | A1 | 9/2006 | Beadle et al. |
| 2007/0110010 | A1 | 5/2007 | Kotola et al. |
| 2007/0124290 | A1 | 5/2007 | Swanson et al. |
| 2007/0168238 | A1 | 7/2007 | Marcken et al. |
| 2007/0192492 | A1 | 8/2007 | Okazaki |
| 2007/0234417 | A1 | 10/2007 | Blakley, III et al. |
| 2008/0028084 | A1 | 1/2008 | Bloching et al. |
| 2008/0091480 | A1 | 4/2008 | Geoghegan et al. |
| 2008/0126567 | A1 | 5/2008 | Wilson |
| 2008/0167906 | A1 | 7/2008 | De Marcken |
| 2008/0167909 | A1 | 7/2008 | De Marcken |
| 2008/0167973 | A1 | 7/2008 | De Marcken |
| 2008/0262878 | A1 | 10/2008 | Webby et al. |
| 2008/0288644 | A1 | 11/2008 | Gilfix et al. |
| 2009/0019118 | A1 | 1/2009 | Jones et al. |
| 2009/0204753 | A1 * | 8/2009 | Bridge et al. ................ 711/106 |
| 2009/0234682 | A1 | 9/2009 | Baggett et al. |
| 2009/0320073 | A1 | 12/2009 | Reisman |
| 2010/0049556 | A1 | 2/2010 | Liu et al. |
| 2010/0064349 | A1 | 3/2010 | Randle et al. |
| 2010/0094856 | A1 | 4/2010 | Rodrick et al. |
| 2010/0198628 | A1 | 8/2010 | Rayner |
| 2010/0220604 | A1 | 9/2010 | Skog et al. |
| 2010/0305983 | A1 | 12/2010 | De Marcken |
| 2011/0029336 | A1 | 2/2011 | Vieillard-Baron et al. |
| 2011/0047018 | A1 | 2/2011 | Lieblang et al. |
| 2011/0055202 | A1 | 3/2011 | Heimendinger |
| 2011/0082942 | A1 | 4/2011 | Takei et al. |
| 2011/0149951 | A1 | 6/2011 | Qiu et al. |
| 2012/0131212 | A1 | 5/2012 | Tang et al. |
| 2012/0239620 | A1 | 9/2012 | Masini et al. |
| 2012/0239724 | A1 | 9/2012 | Masini et al. |
| 2012/0239728 | A1 | 9/2012 | Dor et al. |
| 2012/0239818 | A1 | 9/2012 | Defayet et al. |
| 2012/0284062 | A1 | 11/2012 | Aubry et al. |

FOREIGN PATENT DOCUMENTS

| | | |
|---|---|---|
| EP | 2259217 A1 | 12/2010 |
| KR | 102005006383 | 1/2005 |
| WO | 9832064 A2 | 7/1998 |
| WO | 9922315 A1 | 5/1999 |
| WO | 9960478 A1 | 11/1999 |
| WO | 0063808 A1 | 10/2000 |
| WO | 0219105 A1 | 3/2002 |
| WO | 0229640 A1 | 4/2002 |
| WO | 01033472 A9 | 12/2002 |
| WO | 03034179 A2 | 4/2003 |
| WO | 02025557 A3 | 7/2003 |
| WO | 2008086146 A2 | 7/2008 |
| WO | 2008090530 A2 | 7/2008 |

OTHER PUBLICATIONS

Commonly assigned co-pending U.S. Appl. No. 13/185,417, filed Jul. 18, 2011.
European Search Report for Eurpean application No. 11305278 dated Jul. 5, 2011.
Screenshot of Kayak's home page, http://www.kayak.com/news/kayak-adds-map-based-search-tool-to-popular-ipad-app.bd.html, p. 1 (copyright 2011).
Screenshot of Odopo's home page, http://promos.odopo.co.uk/airtools/escape?map.html, pp. 1-2 (Copyright 2011).
Screenshot of Lufthansa's Trip Finder home page, http://www.lufthansa.com/online/portal/lh/us/nonav/local?nodeid=3322431&l=en, p. 1 (downloaded from the internet Jul. 18, 2011).
European Search Report for European Application No. 11 30 5280 dated Oct. 20, 2011.
European Search Report for European Application No. 11 30 5281 dated Aug. 12, 2011.
European Search Report for European Application No. 11 30 5277 dated Aug. 10, 2011.
Keen et al., "Patterns: SOA Foundation—Business Process Management Scenario", Sections 2.2, 2.3, 5.1-5.3, 7.1-7.4, ibm.com/redbooks, pp. 1-523 (Aug. 1, 2006).
WebSphere Application Server V6 Scalability and Performance Handbook, IBM pp. 1-370 (May 1, 2005).
Sadtler et al., "Patterns: Broker Interactions for Intra- and Inter-enterprise," Sections 3.3-3.5, 4.1-4.3, 5.1-5.3, 6.1-6.3, 91-9.6, ibm.com/redbooks, p. 1-303 (Jan. 1, 2004).
"WebsSphere Edge Server for Multiplatforms: Getting Started," Version 2.0, IBM, pp. 1-119 (Dec. 1, 2001).
USPTO, Office Action issued in related U.S. Appl. No. 13/084,512 dated Sep. 7, 2012.
European Search Report for European Application No. 11 30 5813 dated Nov. 10, 2011.
USPTO, Office Action issued in related U.S. Appl. No. 13/185,417 dated Nov. 6, 2012.
Le Hien Luu, Notice of Allowance issued in related U.S. Appl. No. 13/065,312 dated Oct. 2, 2012.
European Patent Office, Search Report received in European application No. 12368020.9 dated Jan. 24, 2013.
USPTO, Notice of Allowance issued in related U.S. Appl. No. 13/065,312 dated Jan. 18, 2013.
European Patent Office, extended European search report issued in related European application No. 11305280.7 dated Jan. 17, 2012.
Norman L. Rose., "Best Practices in Travel Business Intelligence", May 1, 2008, Retrieved from the Internet: URL: http://www.getthere.com/files/PhoCusWright_Best_Practices_Travel_Biz_Intel.pdf [retrieved on Feb. 13, 2014].
Per Gustafson, "Managing Business Travel: Developments and Dilemmas in Corporate Travel Management", Tourism Management, Pergamon, Amsterdam, NL, vol. 33, No. 2, Mar. 7, 2011, pp. 276-284.
European Patent Office, search report issued in European Application No. 13290280.0 dated Mar. 5, 2014.
IP Australia, Examination Report issued in Patent Application No. 2012278229 dated Jun. 24, 2014.
Intellectual Property Office of Singapore, Written Opinion issued in corresponding Application No. 11201404704U, dated Jun. 8, 2015, 6 pages.
AU, Patent Examination Report No. 1; Australian Patent Application No. 2012378631 (Jun. 19, 2015).
US, Non-Final Office Action; U.S. Appl. No. 13/674,505; (May 8, 2015).
US, Non-Final Office Action; U.S. Appl. No. 13/669,993; (Jun. 17, 2015).
US, Notice of Allowance; U.S. Appl. No. 13/185,417; (Jun. 12, 2015).
U.S. Patent and Trademark Office, Office Action issued in related U.S. Appl. No. 13/170,974 dated Aug. 18, 2015.

* cited by examiner

UPDATING CACHED DATABASE QUERY RESULTS

FIELD OF THE INVENTION

The present invention is directed to the field of database technology and, more specifically, to pre-computing and caching database query results and strategies of keeping these results up-to-date.

BACKGROUND

A common problem in database technology is to ensure short response times to database queries which require processing large volumes of data. For example, such computing-power consuming processing has to be performed in response to so-called "open queries" which contain only little input information (e.g. only one or two parameters out of a dozen possible parameters are specified and/or the specified value ranges of the parameters are broad) and, consequently, lead to a large number of results in general. Possibilities to speed up data processing by increasing hardware performance are limited. Thus, attention is drawn to improving the mechanisms underlying the processing of large data volumes.

One general approach to shorten query times is to pre-compute expected queries and to maintain the corresponding query results in a cache system. Queries are then actually not processed on the large data basis, but are directed to the cache system.

Another issue, however, which comes along with such caching approaches, is to keep the pre-computed query results up-to-date in order to ensure that queries responded by the cached results correctly reflect the status of the corresponding large data basis. In case the underlying data changes, the cached query results get outdated and the cache system would return incorrect results. Thus, strategies are needed how the cache system can be kept up-to-date.

Various relatively simple update strategies are known in the prior art like, for example, re-computing the entire data domain frequently, establishing and maintaining re-computation schedules manually and re-computing data when they are getting too old.

Somewhat more sophisticated update strategies have been developed, as e.g., described by WO 01/33472 and WO 02/25557.

WO 01/33472 concerns an availability system used in a travel planning system. The system includes a cache having entries of availability information regarding airline seats. A cache manager manages entry information in the cache in order to keep information in the cache correct, current, complete or otherwise as useful as possible. In response to a query directed to the cache, the cache manager determines if a stored answer is stale and, if this is the case, sends an availability query to a source of availability information. Cache entries to be modified are obtained by asynchronous notifications from external systems and determined by a deterministic, predictive or statistical model.

Similarly, WO 02/25557 pertains to an information retrieval system wherein information received from information sources is cached for future use, such as for future client requests. Proactive queries can be generated to populate a cache and/or to update presently cached information. In an airline information system, proactive queries are ordered on the basis of statistics or predictive indications such a nearness of departure time, the age of cached data, remaining seats in an aircraft, holidays or special events or equipment type. In addition, updates are received by external notifications from airlines such as AVS messages.

SUMMARY OF THE INVENTION

According to the present invention, a method of updating cached database query results in a distributed database system is provided. The distributed database system comprises a data cache platform which maintains the pre-computed database query results and a computation platform which computes the cached database query results based on data maintained in the computation platform. The data cache platform determines probabilities of the cached database query results being outdated. This determination depends on a probabilistic model and on the occurrence of asynchronous real-time events. The probabilistic model models discrepancies between the cached database query results maintained in the data cache platform and presumed actual database query results. The real-time events are indeterministic with regard to the expiration of the cached database query results and only have a probabilistic influence on the discrepancies between the cached database query results maintained in the data cache platform and presumed actual database query results. The probabilities are generally determined based on the probabilistic model and are possibly amended on the occurrence of asynchronous real-time events. The data cache platform automatically issues re-computation orders to the computation platform for updating cached database query results on the basis of the determined probabilities of the pre-computed database query results being outdated. Cached database query results having a higher probability of being outdated than others are ordered to be re-computed. As results of the re-computation orders, the data cache platform receives the updated pre-computed database query results.

According to another aspect, a database cache platform is configured to execute the method described above.

According to another aspect, a travel reservation system is provided which comprises a data cache platform maintaining cached priced travel recommendations computed by a computation platform based on travel availability data and fares maintained in the computation platform. The data cache platform is configured to execute the method as described above with respect to the cached priced travel recommendations.

According to another aspect, a non-transitory computer readable storage medium is provided which is arranged to, when executed on a computer system, perform the method as described above.

Further aspects are set forth in the dependent claims.

BRIEF DESCRIPTION OF THE SEVERAL VIEWS OF THE DRAWINGS

The present invention will be described with reference to the accompanying figures. Similar reference numbers generally indicate identical or functionally similar elements.

DETAILED DESCRIPTION

Figure 1:
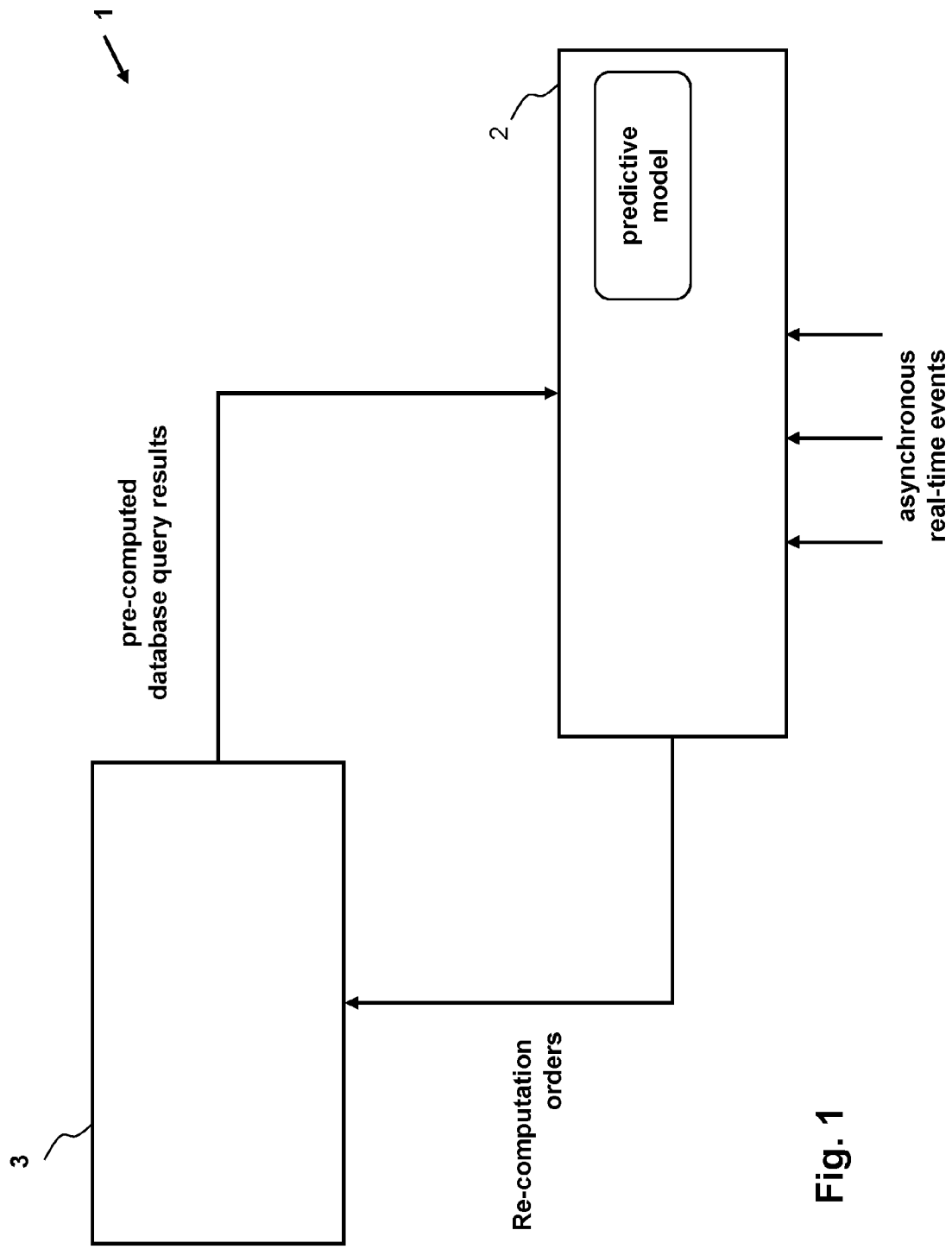
FIG. 1 illustrates a general overview of the distributed database system.

Before turning to the detailed description on the basis of the figures, a few more general aspects will first be set forth with respect to FIG. 1.

In order to be able to handle database queries or batch computation requests which require computations on the basis of large volumes of underlying data, database query results corresponding to expected queries are generally pre-computed and cached (subsequently, the term "query" is used as a general term including any type of information retrieval requests such as transactional queries, requests for batch computations and other forms). The cached results are stored and are returned to the querying entity in response to actually occurring queries. FIG. 1 illustrates such a database system 1 on an abstract level. Basic data is kept in a computation platform 3 which is connected to a cache platform 2. The latter one issues re-computation orders to the computation platform 3 which, in turn, transmits the corresponding results back to the cache platform 2 where the pre-computed query results are stored.

This approach of caching pre-computed query results leads to the general problem that data of the underlying data domain may change over time and, thus, the cached pre-computed query results get outdated. Cached query results which are still up-to-date, i.e. which match the corresponding real-time computation equivalents (results which would be actually computed on demand without having cached pre-computed results available), are called "accurate" cached results hereinafter. Thus, when the cache correctly represents the current state of the data domain underlying the cached query results, the cache is—in general—accurate.

Generally, in order to return correct results on the basis of the cache, one wants to maintain a high degree of correlation between cached database query results which are provided to the querying entity in response to database queries and their real-time computation equivalents. At the same time, however, it is desirable to minimize computation resource consumption caused by re-computations, i.e. to avoid any unnecessary re-computations such as re-computation of still accurate cached query results. Computing resources are limited and, generally, there are not enough computing resources to re-compute all cached query results at all times. Thus, a trade-off between cache accuracy and utilization of the available computing power needs to be found.

The simple approaches of keeping a cache of pre-computed query results up-to-date have several drawbacks.

Re-computing the entire data domain frequently, depending on the amount of data and the available computing resource, e.g. one time per day, might ensure a reasonable balance between cache accuracy and real-time responses. However, this approach is both hardly scalable and inefficient in terms of hardware resource consumption. In particular, also those query results are re-computed which are still valid because the corresponding underlying data has not changed.

Crafting re-computation schedules to determine which query results are to be re-computed at which times manually, by a human administrator, may prove efficient for specific purposes, but it is rigid and inflexible. The schedule needs to be re-crafted again when the assumptions and conditions underlying the schedule change. It also cannot dynamically track a sudden degradation of the cache quality which could arise in the event of massive changes in the underlying data domain. It is also hard to design such a schedule manually, e.g. due to missing objective quality criteria, and to maintain in terms of human costs.

A still further approach is to re-compute data when they are getting too old. Depending on the nature of the underlying data and the query results to be pre-computed, it may, however, be difficult to evaluate good thresholds of "oldness".

In order to render re-computation more efficient, metrics should be defined to evaluate how "unnecessary" a re-computation is. For instance, it is not worth reshooting an entire massive pre-computation every day if less than half of the computed query results turn out to be outdated. On the other hand, if particular classes of query results are known to change frequently, re-computing them several times per day might be beneficial for the accuracy. Consequently, an effective way of assessing or estimating query result accuracy is needed, taking into account both the associated gain on accuracy and the cost of re-computation.

According to the cache update strategy presented herein, re-computations of database query results are decided based on probabilities that the cached database queries are outdated, i.e. potentially differ from results obtained by another re-computation. Only those cached query results which have at least a certain, predetermined probability of inaccuracy are re-computed, whereas other cached query results which probably still accurately reflect the underlying data, i.e. they have a lower probability of being outdated, are not re-computed.

The strategy of updating the cache presented herein relies, as a first aspect, on means to estimate the accuracy of the entire cache of pre-computed database query results on the basis of a predictive model. As a second aspect, it is also checked whether those estimations are generally in line with reality, verifying that the model-based re-computation strategy is still valid on the occurrence of actual real-time (and real-life) events which may serve as indications that, for example, a significant part of the data underlying the cached queries has been changed and—due to these changes—also the corresponding cached queries are out-of-date.

The predictive model, on which the estimations of the cache accuracy generally relies, models the discrepancies between the cached query results and presumed actual database query results, i.e. it approximates the accuracy or inaccuracy of any cached query result. The model models, for example, the probable volatility of the cached results over time. Presumptions on the cached results' volatility are concluded and extrapolated from past real-world experiences on the subject-matter of the respective data domain.

For example, the underlying data may be located in the domain of air travel and contain information on flights such as departure and destination airport, airline, departure and return dates, fares, booking classes and the like. This air-travel related data is kept in the computation platform and is queried by customers in order to get knowledge of availability and prices of air flights. Computing prices on the basis of the basic flight data is resource- and time-consuming. Hence, the actual prices are pre-computed and cached in the present cache platform. In this example, the probabilistic model models the volatility of the flight prices over time. The required knowledge to build such a model can be taken from real-world experiences on the behavior and development of flight prices prior to the departure date. For example, it might be known that flight prices remain relatively stable over the time period prior to one month before the respective departure dates, but get more volatile during the month before the departure date. Hence, the probabilistic model indicates that pre-computed cached prices belonging to flights upcoming in the next month should be re-computed more often than such pre-computed prices which are associated with flights in the more distant future.

In addition to modeling the cache accuracy using the probabilistic model, a severe drop of cache accuracy is prevented by being reactive to real-time events. Re-computation decisions are refined on reception of pre-determined real-time events which might have an impact on the correctness of the cached query results. The real-time events are asynchronous, i.e. the point of time of their occurrence is not predetermined—they can occur anytime. In order to be able to receive and process incoming real-time events, the cache data platform 2 is equipped with external interfaces to communication sources which notify the cache data platform accordingly with the relevant information.

Such real-time events may pertain to particular situations which are not considered in the predictive model. For example, a portion of the cached prices may be affected by a promotion, whereas other prices may go more volatile at a particular time of the year (such as holiday seasons, Christmas etc.). Also "exceptional" situations like a trade fair, a sport event or the like, random events such as strikes or natural disasters could change the presumptions underlying the "normal" model causalities. These particular influences can be considered when determining the probabilities that cached query results are outdated in response to respective real-time events representing such exceptional situations. Alternatively, the impact of scheduled events such as trade fair, holiday seasons, sports events and the like can be introduced into the probabilistic model in good time before the date of the event.

It is important to note that the update strategy presented herein is capable of taking into account "uncertain" events, i.e. such events which do not invalidate one or more pre-computed cached query results with certainty, but only indicate that the probability might be increased that cached database query results are outdated. In other words, these events are indeterministic with regard to the accuracy of cached query results and only have a probabilistic influence on the discrepancies between cached query results maintained in the cache platform 2 and presumed actual database query results resulting from a hypothetical re-computation. This is different from the proposals described in WO 01/33472 and WO 02/25557 wherein the AVS messages, for example, indicate that a particular flight has been cancelled. Consequently, on reception of such an AVS message, it is known with certainty that the respective airplane seats are not available anymore.

For example, referring to the scenario of travel-related data storage as mentioned above, a real-time event having only a potential impact on the accuracy of the cached query results could be a fare update. A fare is a set of data including parameters like departure and destination city, booking class, flight type (one-way or round-trip), an amount of money and rules which define constraints that must be met for the fare to actually apply. Thus, fares represent the basic data for price calculation of a particular flight. If fares for a specific origin-destination-city-pair are updated by the airline, the likelihood may be increased that a pre-calculated and cached flight price regarding this city pair is not correct anymore. However, from the perspective of the data cache platform 2, this is not certain because the fare which was actually applied by the pre-computation platform 3 when pre-computing the cached price is unknown to the data cache platform 2. For example, the fare applied for the previous pre-computation might have actually not been changed and the fare changes indicated by the fare change event do not change the fact that the previously pertinent fare still applies and, therefore, the price calculated before remains valid. Or, the previously applied fare is actually changed, but—due to the change—another fare now applies for calculation of the flight price in question which, in the end, has the effect that the cached price actually remains valid.

Thus, on the observation of such real-time events, the data cache platform 2 can only guess with an indeterministic likelihood that certain cached query results are now outdated and it would be advantageous to re-compute them in order to keep the cache accurate. However, this is not a certain fact and it may well be that the respective cached query results—although their probability of being outdated has increased—are actually still accurate.

The determination of probabilities that cached database query results are outdated is performed in two logical steps: Generally, at the first logical level, the probabilities are identified by using the probabilistic predictive model. Subsequently, at the second logical level, these determined probabilities may be amended in response to incoming real-time events.

Based on the probabilities determined in this manner, the data cache platform 2 automatically generates and issues re-computation orders to the re-computation platform 3 via an appropriate network interface between the two entities (cf. FIG. 1). Generally, re-computation orders are generated with respect to those cached query results which have a higher probability of being outdated than other cached query results which have a lower probability of being outdated. This general rule of thumb may be implemented by using threshold values of the probabilities: Cached query results with a determined probability of being outdated above such a threshold value, need to be re-computed. Accordingly, respective re-computation orders are sent out. Cached query results with a determined probability of being outdated at or below such a threshold value, are considered as likely being still accurate and consequently do not need to be re-computed. Accordingly, no re-computation orders are issued with respect to these cached query results.

The available computation capacities at particular times are taken into account by the data cache platform 2 before sending out the re-computation orders. In order to be capable to consider available resources, the data cache platform 2 needs to have knowledge about the degree and/or schedule of the computation platform's 3 capacity utilization and free computation resources, respectively. The relevant information is populated via the communication link between the two platforms.

In response to receiving a re-computation order, the re-computation platform 3 re-computes the respective query results and returns them to the data cache platform 2 where they are stored and the monitoring and determination of the probabilities recurs.

It is preferable to consider the relation between the probabilistic model and occurring real-time events before deciding whether or not a re-computation decision should be amended or overridden in response to a particular real-time event. Basically, real-time events should be analyzed whether and to which extent they are already present in the probabilistic model. For such events which are sufficiently represented in the model, no amendments are necessary as their occurrence has already taken into account when determining the probabilities of the respective cached database query results on the basis of the probabilistic model. If, on the other hand, a real-time event is not at all predicted by the probabilistic model, i.e. it is not present in the model, it is immediately taken into account and the probabilities and re-computation orders regarding the respective cached database query results are amended as soon as possible.

Optionally, occurring real-time events which are present in the probabilistic model to some extent are accumulated in order to assess trends. If an accumulation of actually emerging real-time events generally modeled by the probabilistic model indicates a burst the extent of which is beyond what is considered by the model probabilities are amended and, if applicable, re-computation orders are overridden accordingly.

Optionally, events are also accumulated and analyzed in groups in order to filter out events which might outdate too few cached query results and/or might be considered irrelevant. Also for this reason, events are logged, collected over time and handled in an aggregated manner. In this way, generating too much re-computation orders in response to low-impact events is prevented and, thus, a disproportional increase of computation resource costs is avoided.

In summary, taking into account real-time events potentially influencing the accuracy of cached database query results at least above a predetermined extent provides a high reactivity to cache degradation.

The present cache update strategy can, for example, be used in conjunction with Amadeus' Massive Computation Platform (MCP), which is subject of the European Patent application 11305518 (unpublished) and which is hereby incorporated by reference herein in its entirety. Employing the present data cache platform in coexistence with the MCP, an enhanced subsystem is available for triggering MCP re-computation. Database query results such as travel recommendations generated by the MCP are duplicated and stored in the data cache platform for further analysis. Re-computation decisions are made on the basis of a probabilistic model which itself may be composed on the basis of statistics data taken from other Amadeus services. In addition, real-time events such as flight fares changes, airplane seat availability changes, booking class invalidations, client flight ticket requests, user quality feedback events, flight cancellations and/or the like are taken into account.

One exemplary application for the present cache update approach is pre-shopping. Before actually booking a travel, end users of the travel industry normally want to inform themselves about available flights including current flight prices, without any commitment to actually book the flight. Very often, such non-binding requests for pre-booking information take the form of open and broad database queries which would require an enormous amount of computing resources when computed only at the time of query. Moreover, customers expect the requested information to be delivered virtually instantaneously in response to their queries. Thus, pre-shopping query results such as priced air travel recommendations are usually pre-computed and cached. Consequently, travel industry pre-shopping forms a suitable application for the cache update strategy proposed herein.

Figure 2:
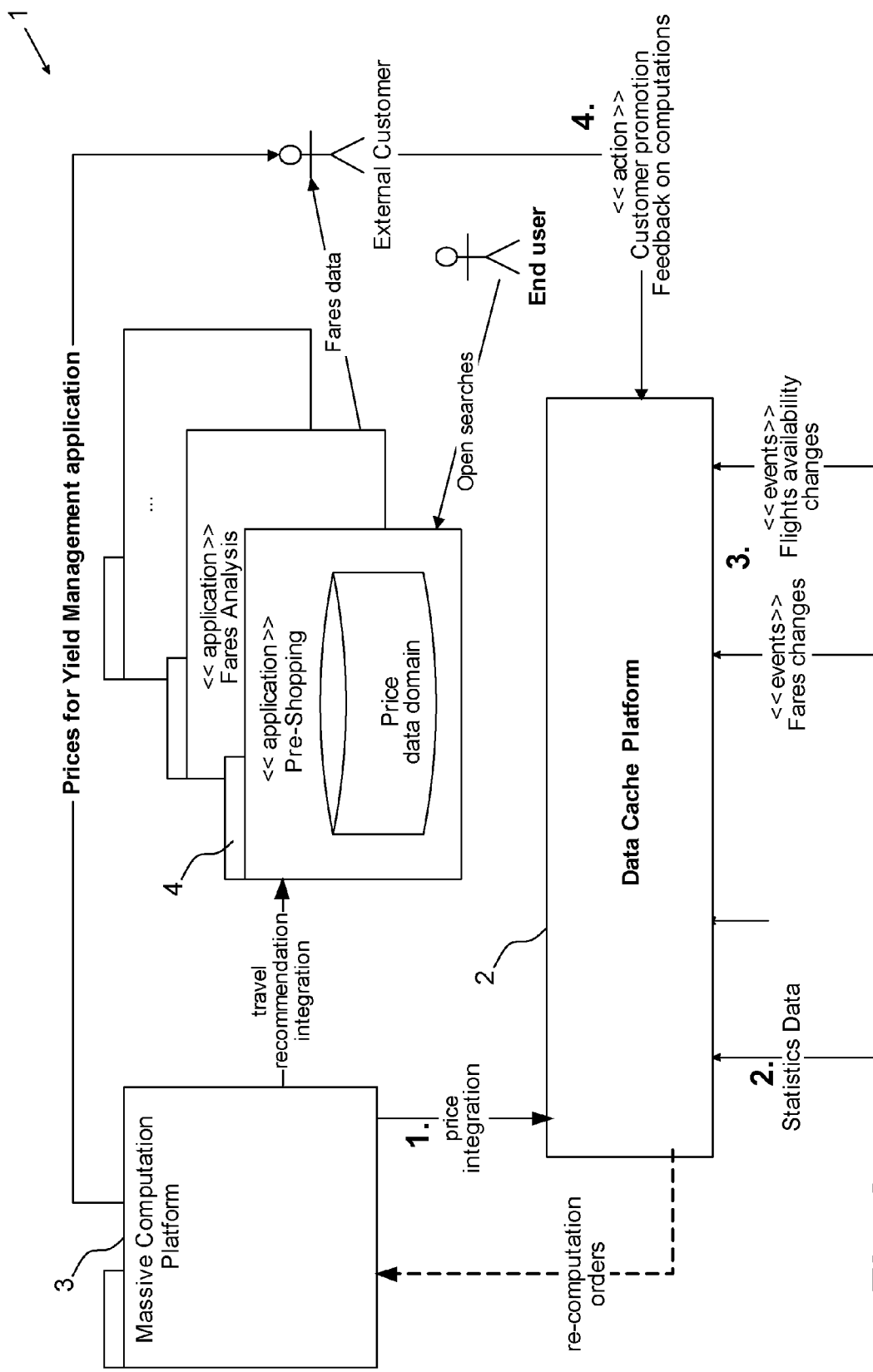
FIG. 2 shows a more detailed view of the distributed database system in accordance with an embodiment.

Now turning to the more detailed description, FIG. 2 shows an overview of the distributed database system 1 according to an exemplary embodiment. The embodiments described subsequently relate to databases in the travel industry. Specifically, an embodiment is presented in which the computation platform 3 maintains data on air travel offers and the cache data platform 2 stores prices related to these air travel offers which the computation platform 3 calculates on the basis of calculation rules, in particular flight fares and their associated calculation rules. However, it should be noted that these embodiment are examples only for the purpose of illustrating the present cache update strategy in more detail. The cache update strategy presented herein can be applied to any kind of data and database query results independent from the structure and/or semantics of the data and the cached results.

As described above, the main entities of the distributed database system 1 are the data cache platform 2 (hereinafter briefly referred to as DCP) and the computation platform 3. In the example of FIG. 2, the computation platform 3 is a Massive Computation Platform (MCP) as disclosed in the European Patent application 11305518. The DCP 2 and the MCP 3 are coupled via at least one communication link which is/are utilized to transmit re-computation orders from the DCP 2 to the MCP 3 and, in response, pre-computed priced travel recommendations (hereinafter also briefly referred to as "prices") back from the MCP 3 to the DCP 2.

The DCP 2 is equipped with additional communication interfaces for incorporating data which it uses for the determination of the accuracy probabilities of the cached prices. These interfaces include, for example, communication links for incorporating statistical data which forms the basis of the probabilistic model and for receiving asynchronous real-time events such as fares changes and flight availability announcements populated by airlines or customer promotion campaigns.

In addition, the distributed database system 1 may comprise application platforms 4 that organize and maintain data which can be queried by end users or external customers such as travel agencies. Application platforms 4 are populated and updated by the MCP 3 via respective communication links between MCP 3 and application platforms 4. This population and update is triggered by the re-computation orders issued by the DCP 2.

As described in general above and more specifically below, in response to the re-computation orders received from the DCP 2, the MCP 3 re-calculates the prices of the travel recommendations and returns them to the DCP 2. Simultaneously, however, the MCP 3 also forwards the recomputed priced travel recommendations to the application platforms 4 and which store them as well (as indicated by "travel recommendation integration" in FIG. 2). Consequently, also the application platforms 4 cache the pre-computed priced travel recommendations which are queried by users, on the basis of the cache update strategy implemented by the DCP 2. Thus, the present cache update strategy is leveraged to applications which provide benefits to users, e.g. in form of instant responses to open queries. In such an arrangement, the data cache platform 2 acts as a control platform arranged to control and trigger the updates of the application platforms' 4 caches. Thus, the cached database query results stored in the data cache platform 2 are not actually accessed or queried by any users or customers, but merely form the control data basis on which the cache update strategy is performed. However, in other arrangements, the data cache platform 2 may also be directly queried by users or customers, or—in other words— the present cache update strategy may be implemented directly in one or several application platform(s) 4 as opposed to a separate control entity.

The application platforms 4 comprise, for example, a pre-shopping application platform, a fares analysis application platform, and other platforms. The pre-shopping application platform is queried by end users who wish information about flight availability and prices. For example, an end user could direct a query to the pre-shopping application in order to obtain an overview of prices of travel offers during the holiday season departing from Nice below 500 Euros. Due to the pre-computed priced travel recommendations cached in the pre-shopping application which are updated in line with the present cache update strategy, prices of the respective flights do not need to be computed at the time of the occurrence of the query. Rather, a list of travel offers fulfilling these rather unspecified constraints can be returned very fast on the basis of the priced travel recommendations cached in the pre-shopping application platform. The user can then select a travel from the returned list that suits him/her best and can then issue a further request for actually booking this travel. The second request is then processed by a booking engine (not shown) which calculates the current and actual price and suggests a binding offer to the user.

Figure 3:
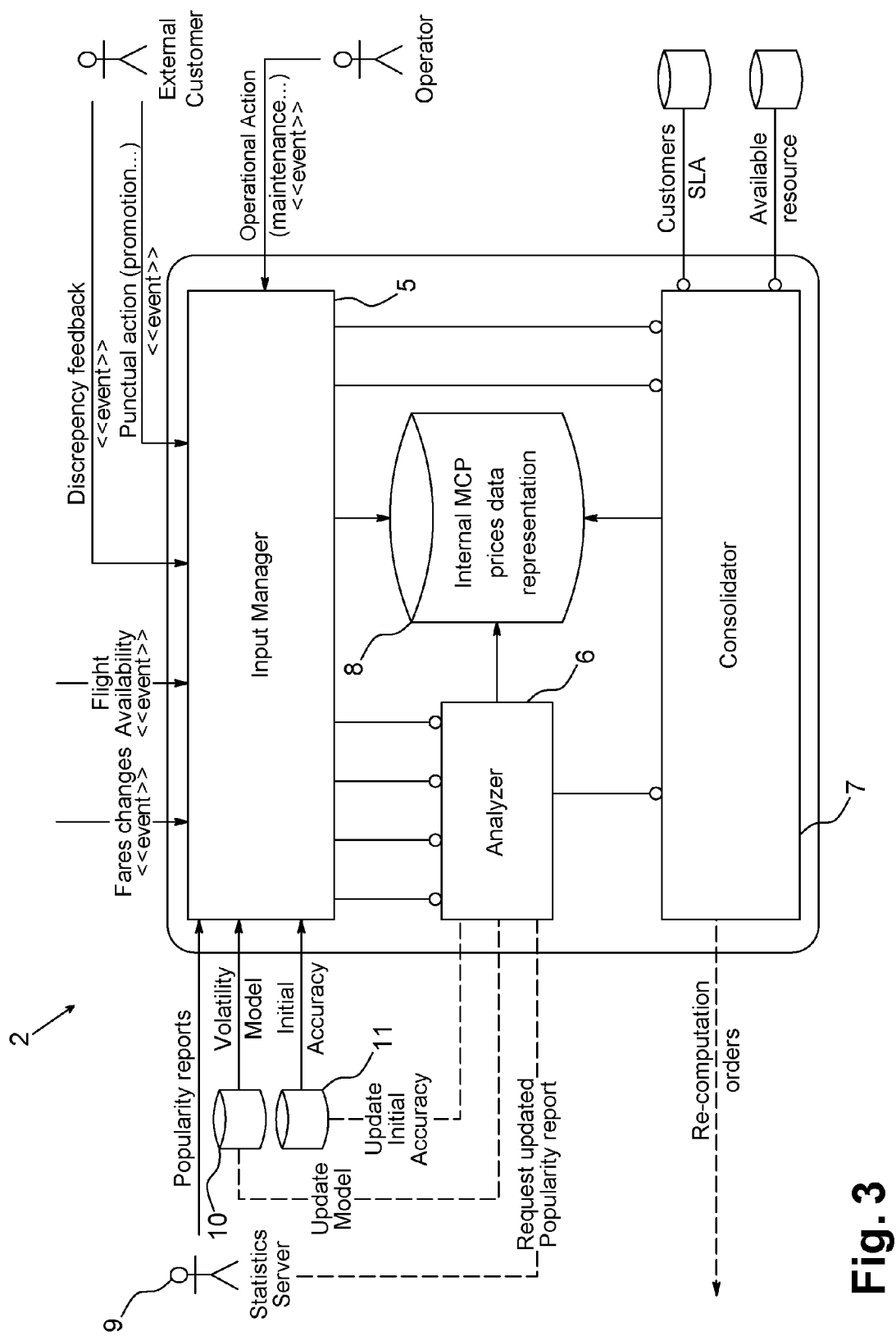
FIG. 3 illustrates the components of the cache platform in accordance with an embodiment.

Now having a closer look at the structure of the data cache platform 2 which is depicted by FIG. 3, the data cache platform 2 is composed of three modules:

The input manager 5 is responsible for receiving inputs such as pre-computed database query results from the MCP 3, asynchronous real-time events and other information such as statistical data to feed and update the probabilistic model.

The analyzer 6 utilizes the probabilistic model on the basis of which it is arranged to determine candidate cached query results to be updated.

Finally, the consolidator 7 amends the probabilities determined by the analyzer 6 and—when necessary—also the probabilistic model on the basis of observed real-time events (the latter is not shown in FIG. 3).

In addition, the DCP 2 includes an internal database 8 which keeps the cached priced travel recommendation data. This representation only retains attributes of the price information which are relevant for assessing the out-of-date probabilities and deciding on the re-computation decision, such as, for example: city pair, the departure date, stay duration, and date of last computation, all of which being outputs of computations returned by the MCP 3. Other data utilized by the MCP 3 in order to perform its computations such as fares are not mirrored to the DCP 2 as they are not necessary to perform the cache update strategy. On the other hand, however, the DCP 2 enriches its data with meta-data attributes (which are not part of the data sets returned by the MCP 3), such as an initial presumed accuracy (chances that a price just re-computed by the MCP 3 differs from calculation for booking), volatility (indication of the probability that a price differs from calculation for booking since its last computation) and a popularity (how often the flight is searched for and booked). The data needed for setting these attributes is kept in external databases such as a volatility database 10, an initial accuracy database 11 and statistics servers 9. The meta-data attributes represent the probabilistic model on the basis of which the analyzer 6 determines the probabilities whether cached prices might be outdated (as will be explained in more detail below).

The input manager 5 is arranged to convert and integrate all the heterogeneous sources of information into the local representation database 8 of the prices returned by the MCP 3. It records events and actions that potentially impact modeled prices. These events include customer promotions and customer discrepancies feedback. Furthermore, flight availability events like flight cancellations do not only invalidate the cached travel recommendations which are directly based on the canceled flight, but may also influence parallel cached data such as flights of the same city pair which are scheduled at the same time of the cancelled flight. These real-time events are then forwarded to the consolidator 7 which processes them further in order to amend out-of-date probabilities and re-computation decisions.

Due to the amount of information involved in caching the priced travel recommendations, it is beneficial to employ encoding techniques. By this, the priced data cached in the DCP 2 is globally mapped to the underlying data domain kept in the MCP 3 while reducing costs for storage resources significantly. Probabilistic encoding is, for example, implemented by using Bloom Filters. The effect of such encoding is twofold. First, Bloom filters are conservative. They allow to positively track at least and in any case those prices which are probably impacted e.g. by a real-time event indicating fares changes, but they are not wrong on the reverse, prices which are considered to be not affected are actually not affected. So there is no risk of failing to recognize prices potentially influenced by such a fares change event. Secondly, the amount of false positive indications strictly depends on the allocated size of the Bloom Filter, so one can limit their occurrence as needed.

The second module, the analyzer 6, performs the first, general level of determination of the probabilities whether the cached priced travel recommendations are outdated based on the model of probabilistic degradation of the accuracy of the pre-computed prices kept in the DCP 2. It examines and evaluates the meta-data added to the prices by the input manager 5, as explained above. The probabilistic model represented by this meta-data thus includes metrics regarding price volatility included by the volatility database 10, initial accuracy of prices incorporated from the initial accuracy database 11 and the popularity of flight recommendations as returned by popularity reports from the statistics servers 9. It outputs probability and priority information regarding the cached prices to the consolidator 7, i.e. indications which prices need to be recomputed with priority based on the static probabilistic information only (i.e. without considering any event).

There are several ways of utilizing the information of the probabilistic model in order to prioritize and to decide which prices to re-compute next. The analyzer 6 is configurable to apply those strategy or a strategy mix depending on the situation (e.g. in accordance to an agreement with the customer owning the underlying travel data in the MCP 3, depending on the amount of data, depending on the available computation resources, depending on the objection in which way the cache should be optimized). The following strategies may be applied:

Accuracy of prices: This aims at maximizing the global accuracy of the date domain. Presumably inaccurate prices are re-computed first.

Accuracy of prices, weighted with the popularity: Among the priced which are likely to be inaccurate, more popular prices will be re-computed with higher priority than less popular prices.

Accuracy of prices, weighted with the popularity and by their age: Like the previous strategy, but also taking into account the time of the last re-computation. This strategy prevents re-computation starvation caused by very volatile prices, in particular in the context where re-computation resources are limited as compared with the amount of prices which generally should be re-computed.

Modulate the popular city pairs based on their geo-location and on the re-computation hour: This strategy additionally takes statistics into account which city-pair flights are queried more often at particular times of a day. As an effect, frequent re-computations are avoided at those times at which flights of specific city pair are seldom accessed (because inaccurate cached data does not harm as long as respective queries actually do virtually not occur).

As a side effect, the analyzer 6 updates the volatility model database 10 based on the values of recently re-computed prices received from the MCP 3 and incorporated into the DCP 2. As the analyzer can track the actual volatility of cached prices based on repeating re-computations, it can feed these statistical information back to the volatility model database 10. To update the volatility model, the analyzer 6 counts the number of differences between the newly computed price results and the previously received price values. From these differences it updates the volatility parameters for the respective parts of the analyzed prices.

Likewise, the analyzer 6 may update the initial accuracy database 11 in the same manner. It may also ask for other popularity reports, for example, if prices from new city pairs have been integrated in the DCP 2 for the first time.

In case there are no history and statistical data, respectively, for volatility, accuracy or popularity of prices, the analyzer 6 performs its processing with default parameters to be as conservative as possible.

Turning now to the third module, the consolidator 7 performs the second level of the probability determination by taking into account incoming real-time events. In addition, it is the entity which generates the re-computation orders and issues them to the MCP 3. It takes the outputs of the analyzer 6 as a base for its decision. These provide a first estimate of the re-computation priorities for all prices of the data domain. Then, it overlays all the information gathered from the various sources of real-time events to amend the re-computation priorities. This results in enhanced re-computation priorities.

Optionally, it may consider any customer service level agreement such as, for example, "guarantee that all prices will be recomputed at least once every week", and amend the priorities accordingly. It selects those entries in the internal prices data representation 8 with the highest priorities first and marks them for re-computation. As the consolidator preferably has knowledge of the computation resources available at the MCP 3, it is able to earmark as many cached prices as can be re-computed by the MCP 3 in a particular time interval. It then sends the resulting re-computation order to the MCP 3.

Information from real-time events is a means to improve the accuracy of the cached data over strict statistical modeling. They can be used to track what is really happening instead of only what was expected. It is a means to control the predictions of the statistical model and amend them/it when the predictions are proved wrong or inappropriate. Several classes of real-time events can be envisaged with respect to the present embodiment:

Actors' events generally occur selective (i.e. from time to time), but may have a drastic influence on the re-computation decisions. Externals customer may provide feedback on the discrepancies between cache and shopping that he is experiencing on his own platform. This feedback can be used to amend the accuracy predicted by the statistical model and thus force sooner re-computations when needed. When a provider of data stored in the MCP 3 (e.g. a travel provider offering travels) performs a promotion campaign promoting flights on certain city pairs, it can be assumed that these prices are more volatile and get outdated more often. Thus, the re-computation frequency of these prices during the promotion campaign might be needed to be increased. As another example, a maintenance operation for the MCP 3 may be necessary from time to time or operational issues may be experienced within the system 1. In such cases, the DCP 2 can be commanded to generate less or no re-computation orders until the maintenance is done and the issue is recovered, respectively.

Availability events indicate a real-time status on the accuracy of cached flights. Depending on the statement of the event, it may be known with certainty that a specific price of the underlying data domain in the MCP 3 has changed and the price cached by the DCP 2 has therefore become invalid. However, also other prices may be affected, wherein the effect is uncertain and, therefore, the probability that these prices are outdated may be increased. For instance, a "class closed" event indicates that a particular booking class has become full for a particular flight. Seats in this flight and class are no longer bookable and thus the respective prices cached by the DCP 2 have become invalid with certainty. However, this might be considered as an indication that other classes of the same flight and/or seats in the same class in other flights departing shortly before or after this flight might get more volatile. Thus, their probabilities of getting outdated might increase and re-computating of these prices might be beneficial. As another example, it is experienced that low-cost carriers set the price of their seats depending on the flight occupancy. Upon notifications of occupancy changes, respective cached prices can quickly be re-computed and thus cache accuracy is improved/regained.

The implications of changes-of-fares events are difficult to estimate. Simply said, fares contain information and logic such as rules which are used to calculate a price of a particular flight. Thus, when calculating the actual price of a particular flight, a set of fares is accessed, it is decided which fare is relevant and is actually to be applied and, finally, the price is calculated. Thus, there is a relationship "flight→fare(s)" (which, however, also may change over time, as the constraints which fare applies to a particular flight can change). However, relations in the other direction "fare→flights" are generally not tracked, i.e. it is not clear which fare does apply to which flights. Moreover, a change in a fare potentially impacts a huge amount of prices calculated from the underlying data domain.

In order to determine the impact of fares events, the communication between the MCP 3 and the DCP 2 can be utilized to provide the DCP 2 with a mapping to fares applied by the MCP 3 for computing prices. When computing prices in response to re-computation orders, the MCP 3 records all fares accessed for calculating the requested prices. This information is then stored globally in a mapping fares↔flights and maintained during every computation by the MCP 3. At the time a fares change event is received, the input manager 5 searches this global mapping in order to determine the flights impacted by the fares change event and marks them as "updated". Note that a fare change does not necessarily imply a price change for a travel recommendation, as briefly explained above.

The consolidator 7 first assesses the potential influence of the real-time event on the cached prices rather than initiating re-computation of cached travel recommendations without having considered the relationship of the event with the basic probabilistic model. Such events are first analyzed with respect to their representation in the probabilistic model. For events which are not predictable and, thus, not included in the probabilistic model at all like, for example, promotions campaigns or maintenance events, the events are processed as soon as possible. Events, however, which are represented in the probabilistic model at least to a certain extent like fares or availability changes, are accumulated and their appearance is compared with the predictions of the probabilistic model. When event peaks do not match the model locally, i.e. a burst of events is significantly outside the statistic underlying the probabilistic model, the impacted prices are marked as potentially outdated in order to re-compute them as soon as possible. By this, "noise" caused by events already present in the probabilistic model and therefore already considered by the determinations conducted by the analyzer 6 beforehand, is filtered out.

Optionally, for optimization purposes, the consolidator 7 works on a grid-view of the internal data representation 8, i.e. it considers groups of adjacent prices together during its algorithm instead of working on the set of prices in an isolated manner. In this approach, adjacent price data sets are seen as a single data set with aggregated properties' values. Working on aggregated data sets limits the generation of sparse re-computation orders, and thus increases mutualisation and optimization opportunities at the MCP 3. This reduces computation costs.

Figure 4:
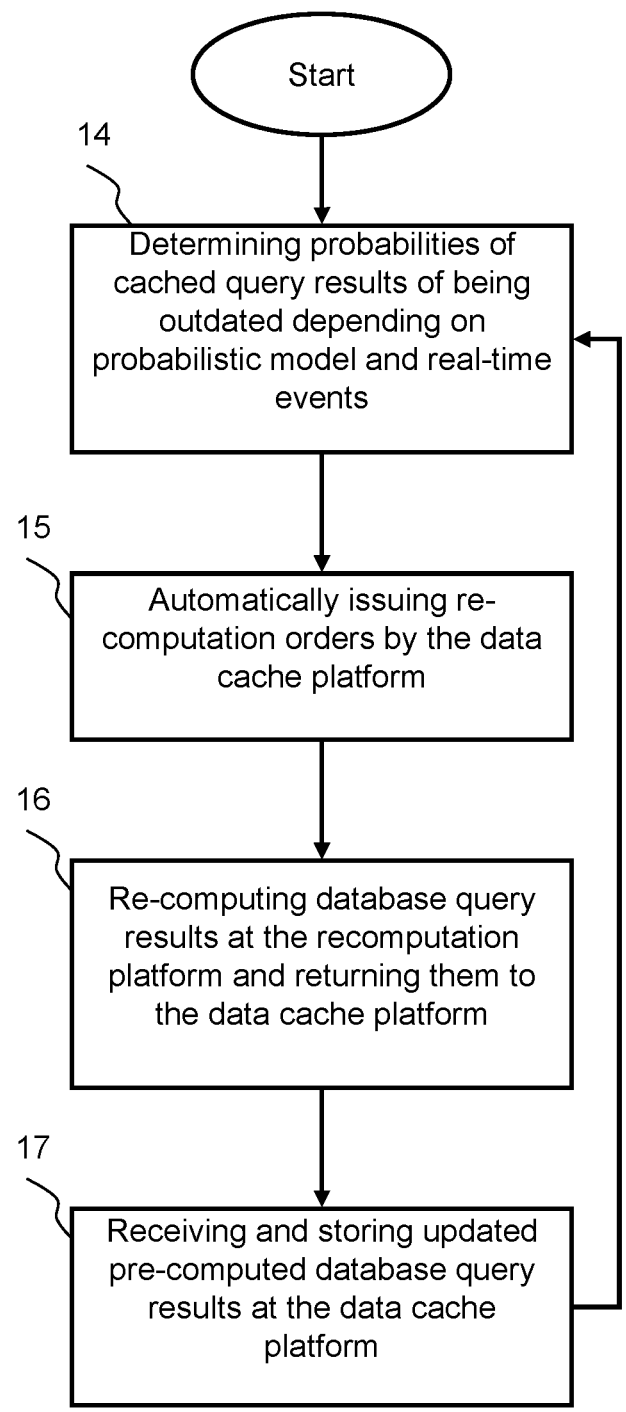
FIG. 4 depicts a flow diagram in accordance with an embodiment of the method.

FIG. 4 summarizes the above detailed description and gives an overview of the cache update method presented herein.

The process of keeping the cache of pre-computed database query results up-to-date starts with the determination 14 of probabilities of inaccurateness of the cached query results. This determination is composed of two activities which are located on two logical levels: Firstly and generally, a predictive model based on statistical and probabilistic data is employed in order to estimate the likelihood that a particular cached query result does not correspond to the query result (hypothetically) re-calculated. Secondly and more specifically, real-time events are taken into account which potentially impact and increase, respectively, the probability that cached query results are outdated. These real-time events are characterized by the fact that they, in general, do not indicate an inaccuracy of particular cached query results with certainty, but are indeterministic in this respect. Thus, on their occurrence, one can only draw probabilistic conclusions on the likelihood of accuracy and inaccuracy, respectively.

On the basis of the determined probabilities that the cached database query results are outdated, the database re-computation orders are automatically issued 15 by the DCP 2. These orders are received by the MCP 3 which then re-computes the respective results and returns the results 16 to the DCP 2. In turn, the DCP 2 receives the results and stores the results 17 in a local representation 8. This concludes one update cycle and the next cycle re-iterates with the probability determination 14.

Figure 5:
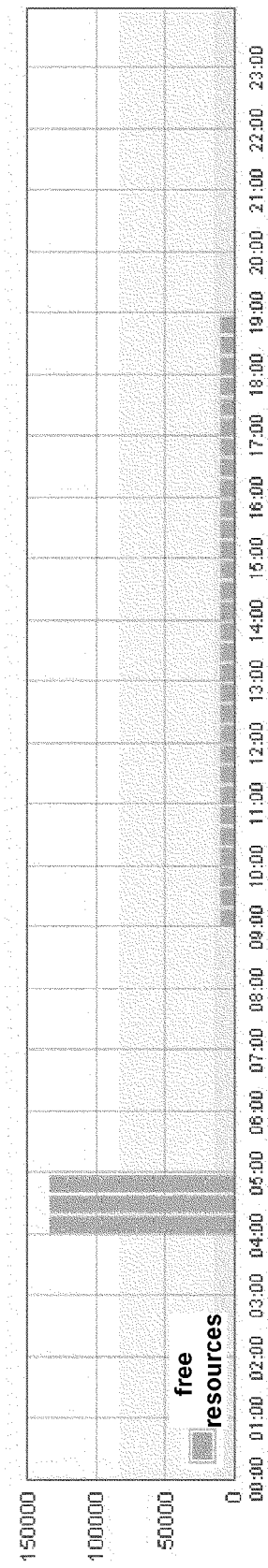
FIG. 5 shows exemplary resource availability for re-computation in accordance with an embodiment.

Next, a particular example with regard to timing of the procedure of the present cache update strategy is described with respect to FIG. 5. In this example, the DCP 2 is configured to generate re-computation orders every 20 minutes, i.e. a round or cycle of determining probabilities whether cached data is out-of-date and generating and issuing re-computation orders takes 20 minutes. The resources at the MCP 3 are known a priori for a whole day and the DCP 2 is aware of the computation resources available at the MCP 3 and is therefore able to synchronize the amount of re-computations with the MCP's 3 available resources.

At the beginning of a re-computation cycle, the DCP 2 analyzes the current accuracy of the cached database query results, i.e. the priced travel recommendations stored in the internal database 8. The round will yield a set of re-computation orders that will be processed by the MCP 3 at the end of the 20-minutes round. Meanwhile, on MCP 3 side, orders from the last cycle are being computed and new price recommendation are generated and transmitted back to the DCP, where they are stored and available for analysis and update of recurring information in the next cycle.

FIG. 5 shows that the MCP has significant available resources in the time interval between 04:00 and 05:00 a.m., so a lot of re-computations can be performed in this hour. Afterwards, however, no resources are available until 9:00 a.m., so no re-computation is possible at that time. Later during the day, from 09:00 a.m. to 7:00 p.m., some resources are available at the MCP 3.

During the cycle starting at 04:20 a.m., the analyzer 6 analyzes the cache accuracy, while the consolidator 7 generates re-computation orders accordingly. Those orders will be implemented by MCP 3 at 04:40 a.m. The analyzer 6 focuses the MCP price recommendation it received at the beginning of the round. It counts the differences between the received prices and the previous prices whose value has been stored in an internal repository. Based on the differences, it amends the "volatility" recurring source of information. The input manager 5 saves the received MCP prices for further inspection.

In 4:40-to-5:00 a.m. cycle, the MCP 3 processes the re-computation orders received from the DCP 2 during the interval 04:20 to 4:40 a.m. The DCP 2 is aware that it cannot generate any re-computation orders for the time slice to come (05:00 a.m.) and its successors until 09:00 a.m. However, it still analyzes the data model continuously to update the current accuracy of all cache priced travel recommendations. It will do the same for every future cycle until 08:40 a.m.

At 08:40 a.m., the analyzer 6 determines that the accuracy of the cache decreased during the previous four hours without any re-computation. It generates re-computation orders accordingly over the following cycles, but only to a less extent due to the limited amount of available resources at the MCP 3 from 09:00 a.m. to 7:00 p.m. Then, at 09:00 a.m., MCP 3 starts processing the new re-computation orders it received in the interval before (i.e. 08:40 to 09:00 a.m.) and will stop after the end of the round lasting from 6:40 to 7:00 p.m.

After that, no further resources are available at the MCP 3 throughout the night. Thus, the DCP 2 will not generate any further re-computation orders, but continue to analyze the cache accuracy on the basis of the probabilistic model and possibly incoming real-time events.

Figure 6:
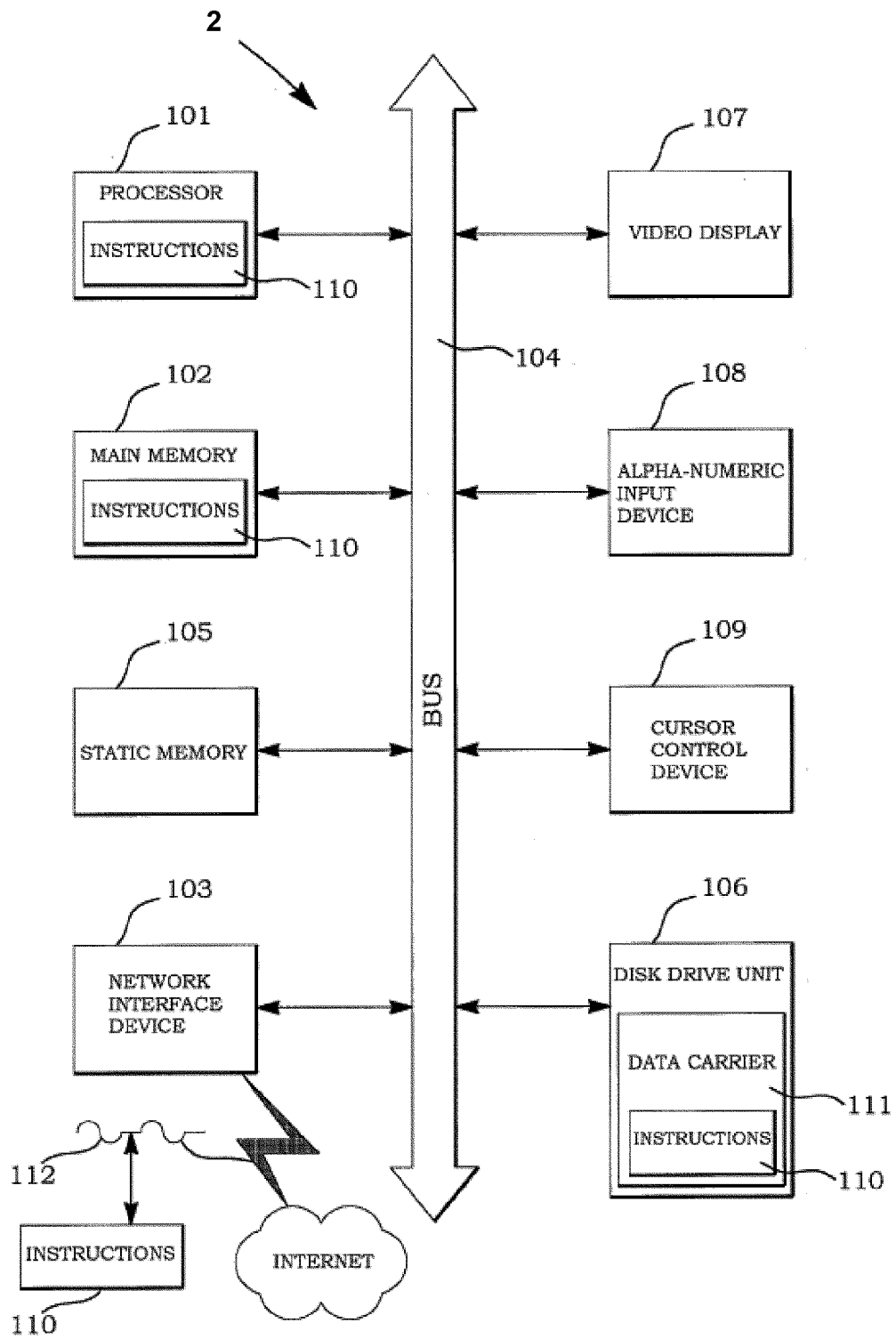
FIG. 6 shows a schematic representation of a cache platform computer in accordance with an embodiment.

Finally, FIG. 6 is a diagrammatic representation of a computer system which provides the functionality of the data cache platform 2 of FIG. 2. Within the cache platform 2 a set of instructions, to cause the computer system to perform any of the methodologies discussed herein, may be executed. The data cache platform 2 includes a processor 101, a main memory 102 and a network interface device 103, which communicate with each other via a bus 104. Optionally, it may further include a static memory 105 and a disk-drive unit 106. A video display 107, an alpha-numeric input device 108 and a cursor control device 109 may form a distribution list navigator user interface. The network interface device 103 connects the data cache platform 2 to the computation platform 3, the sources of statistical data needed to fill up the predictive model such as the statistics servers 9, the volatility database 10 and the initial accuracy database 11, the sources of real-time events, the Internet and/or any other network. A set of computer-executable instructions (i.e. computer program code) 110 embodying any one, or all, of the methodologies described above, resides completely, or at least partially, in or on a machine-readable medium, e.g. the main memory 102 and/or the processor 101. A machine-readable medium on which the code 110 resides may also be a non-volatile data carrier 111 (e.g. a non-removable magnetic hard disk or an optical or magnetic removable disk) which is part of disk drive unit 106. The code 110 may further be transmitted or received as a propagated signal 112 via the Internet through the network interface device 103.

The present cache update strategy provides a means to automatically generate cache re-computation decisions. It determines which cached query results are to be re-computed and controls the re-computation also time-wise by taking into account the available computation resources at the computation platform. Thus, in general, the accuracy of the cached query results is estimated on the probabilistic model which models the up-to-dateness and out-of-dateness, respectively, over time. This out-of-date-analysis enables processing several billions of sets of data per hour underlying the re-computation of cached database query results.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, radiofrequency (RF), infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicants' general inventive concept.

What is claimed is:

1. A method of updating query results in each of a plurality of distributed application platforms using a data cache platform for maintaining a first cache of query results and a computation platform for computing the query results, each query result including a pre-computed price for a travel recommendation, the method comprising:
    determining, by the data cache platform, probabilities of the pre-computed prices of the query results in the first cache being outdated based on a probabilistic model that estimates likelihoods that the pre-computed prices of the query results in the first cache are inaccurate based at least in part on meta-data attributes of the query results in the first cache;
    automatically issuing, by the data cache platform, re-computation orders to the computation platform for updating the query results in the first cache on a basis of the determined probabilities of the pre-computed prices of the query results in the first cache being outdated, wherein the query results in the first cache having a higher probability of being outdated than others are ordered to be re-computed;
    in response to receiving the re-computation orders, computing, by the computation platform, updated query results and transmitting the updated query results to the data cache platform and each of the application platforms, each of the application platforms maintaining a respective second cache of query results;
    receiving, at the data cache platform, the updated query results as results of the re-computation orders;
    enriching, by the data cache platform, the updated query results with the meta-data attributes; and
    updating, by the data cache platform, the query results in the first cache with the enriched query results,
    wherein the query results in each second cache are updated with the updated query results independently of the content of the second cache as a result of the re-computation orders issued by the data cache platform.

2. The method of claim 1, wherein the probabilistic model models a volatility of data maintained in the computation platform based on statistical historic data.

3. The method of claim 1, wherein the data cache platform, when determining the probabilities of the pre-computed prices of the query results in the first cache being outdated and issuing the re-computation orders, considers grids of the query results in the first cache corresponding to groups of adjacent sets of data maintained in the computation platform.

4. The method of claim 1, wherein the data cache platform issues the re-computation orders based on an amount of available computation resources at the computation platform.

5. The method of claim 1, wherein the computation platform maintains information on travel availability and fares, and the data cache platform maintains priced travel recommendations calculated from the information on the travel availability and the fares.

6. The method of claim 1 further comprising:
    receiving the updated query results at each of the application platforms; and
    updating the query results in the respective second cache of each of the application platforms with the received query results.

7. The method of claim 1 wherein:
    determining the probabilities of the pre-computed prices of the query results in the first cache being outdated is further based on an occurrence of one or more asynchronous real-time events,
    the one or more asynchronous real-time events are indeterministic with regard to accuracy of the query results in the first cache and only have a probabilistic influence on the likelihoods the query results in the first cache maintained by the data cache platform are inaccurate, and
    the probabilities determined based on the probabilistic model are amended on the occurrence of the one or more asynchronous real-time events.

8. The method of claim 7 further comprising:
    analyzing, at the data cache platform, whether the one or more asynchronous real-time events are represented in the probabilistic model;

for each of the one or more asynchronous real-time events which are not represented in the probabilistic model, issuing re-computation orders for corresponding query results in the first cache; and for each of the one or more asynchronous real-time events which are represented in the probabilistic model, accumulating such real-time events over a certain period of time, comparing the actually occurred and accumulated real-time events with their representation in the probabilistic model and, if the actually occurred and accumulated real-time events deviate from their representation in the probabilistic model to a predetermined extent, issuing re-computation orders with respect to potentially affected query results in the first cache.

9. The method of claim 7 wherein the one or more asynchronous real-time events comprise flight fare changes, airplane seat availability changes, client flight ticket requests and/or flight cancellations.

10. A system for updating query results in each of a plurality of distributed application platforms, each query result including a pre-computed price, the system comprising:
at least one processor; and
at least one memory coupled to the at least one processor and including program code that, when executed by the at least one processor, causes the system to:
determine probabilities of the pre-computed prices of query results in a first cache being outdated based on a probabilistic model that estimates likelihoods that the pre-computed prices of the query results in the first cache are inaccurate based at least in part on meta-data attributes of the query results in the first cache;
automatically issue re-computation orders for updating the query results in the first cache on a basis of the determined probabilities of the pre-computed prices of the query results in the first cache being outdated, wherein the query results in the first cache having a higher probability of being outdated than others are ordered to be re-computed;
in response to receiving the re-computation orders, compute updated query results and transmit the updated query results to each of the application platforms, each of the application platforms maintaining a respective second cache of query results;
enrich the updated query results with the meta-data attributes; and
update the query results in the first cache with the enriched query results,
wherein the query results in each second cache are updated with the updated query results independently of the content of the second cache as a result of the re-computation orders issued by the system.

11. The system of claim 10, wherein the probabilistic model models a volatility of the pre-computed prices based on statistical historic data.

12. The system of claim 10 wherein the program code further causes the system to:
further determine the probabilities of the pre-computed prices of the query results in the first cache being outdated based on an occurrence of one or more asynchronous real-time events that are indeterministic with regard to accuracy of the query results in the first cache and only have a probabilistic influence on the estimated likelihoods of the pre-computed prices of the query results in the first cache being inaccurate;
amend the probabilities determined based on the probabilistic model on the occurrence of the one or more asynchronous real-time events;
analyze whether the one or more asynchronous real-time events are represented in the probabilistic model;
for each of the one or more asynchronous real-time events which are not represented in the probabilistic model, issue re-computation orders for corresponding query results in the first cache; and
for each of the one or more asynchronous real-time events which are represented in the probabilistic model, accumulate such real-time events over a certain period of time, compare the actually occurred and accumulated real-time events with their representation in the probabilistic model and, if the actually occurred and accumulated real-time events deviate from their representation in the probabilistic model to a predetermined extent, issue re-computation orders with respect to potentially affected query results in the first cache.

13. The system of claim 12, wherein the real-time events comprise flight fare changes, airplane seat availability changes, client flight ticket requests and/or flight cancellations.

14. The system of claim 10 wherein the program code further causes the system to:
consider grids of the cached query results corresponding to groups of adjacent sets of data when determining the probabilities of the pre-computed prices of the query results in the first cache being outdated and issuing the re-computation orders.

15. The system of claim 10 wherein the re-computation orders are issued to a computation platform, and the program code further causes the system to:
issue the re-computation orders based on an amount of available computation resources at the computation platform.

16. The system of claim 10 wherein the re-computation orders are issued to a computation platform, the system comprises a travel reservation system, the computation platform maintains information on travel availability and fares, and the system maintains priced travel recommendations calculated from the information on the travel availability and the fares.

17. A travel reservation system comprising a data cache platform maintaining a first cache of travel recommendations computed by a computation platform in communication with a plurality of distributed application platforms each maintaining a respective second cache of travel recommendations, each travel recommendation including a pre-computed price, the data cache platform comprising:
a first processor; and
a first memory coupled to the first processor and including first program code that, when executed by the first processor, causes the data cache platform to:
determine probabilities of the pre-computed prices of the travel recommendations in the first cache being outdated based on a probabilistic model that estimates likelihoods that the pre-computed prices of the travel recommendations in the first cache are inaccurate based at least in part on meta-data attributes of the travel recommendations in the first cache;
automatically issue re-computation orders to the computation platform for updating the travel recommendations in the first cache on a basis of the determined probabilities of the pre-computed prices of the travel recommendations in the first cache being outdated, wherein the travel recommendations in the first cache having a higher probability of being outdated than others are ordered to be re-computed;
receive updated query results as results of the re-computation orders;

enrich the updated query results with the meta-data attributes; and
update the travel recommendations in the first cache with the enriched query results;
the computation platform comprising:
a second processor; and
a second memory coupled to the second processor and including second program code that, when executed by the second processor, causes the computation platform to:
in response to receiving the re-computation orders, compute the updated query results and transmit the updated query results to the data cache platform and each of the application platforms,
wherein the travel recommendations in each second cache are updated with the updated query results independently of the content of the second cache as a result of the re-computation orders issued by the data cache platform.

18. The travel reservation system of claim 17 wherein the first program code further causes the data cache platform to:
further determine the probabilities of the pre-computed prices of the travel recommendations in the first cache being outdated based on an occurrence of one or more asynchronous real-time events that are indeterministic with regard to accuracy of the travel recommendations in the first cache and only have a probabilistic influence on the likelihoods the travel recommendations in the first cache are inaccurate;
amend the probabilities determined based on the probabilistic model on the occurrence of the one or more asynchronous real-time events;
analyze whether the one or more asynchronous real-time events are represented in the probabilistic model;
for each of the one or more asynchronous real-time events which are not represented in the probabilistic model, issue re-computation orders for corresponding travel recommendations in the first cache;
for each of the one or more asynchronous real-time events which are represented in the probabilistic model, accumulate such real-time events over a certain period of time, compare the actually occurred and accumulated real-time events with their representation in the probabilistic model and, if the actually occurred and accumulated real-time events deviate from their representation in the probabilistic model to a predetermined extent, issue re-computation orders with respect to potentially affected query results in the first cache.

19. The travel reservation system of claim 17, further comprising:
the application platforms, wherein each of the application platforms comprises:
a respective third processor; and
a respective third memory coupled to the third processor and including respective third program code that, when executed by the third processor, causes the application platform to:
receive the updated query results; and
update the query results stored in the respective second cache with the received query results.

20. A computer readable storage medium having computer program instructions stored therein for maintaining cached query results including pre-computed prices, which when executed on a computer system cause the computer system to:
determine probabilities of the pre-computed prices of the query results in a first cache being outdated based on a probabilistic model that estimates likelihoods that the pre-computed prices of the query results in the first cache are inaccurate based at least in part on meta-data attributes of the query results in the first cache;
automatically issue re-computation orders for updating the query results in the first cache on a basis of the determined probabilities of the pre-computed prices of the query results in the first cache being outdated, wherein the query results in the first cache having a higher probability of being outdated than others are ordered to be re-computed;
in response to receiving the re-computation orders, compute updated query results and transmit the updated query results to a plurality of application platforms, each of the application platforms maintaining a respective second cache of query results;
enrich the updated query results with the meta-data attributes; and
update the query results in the first cache with the enriched query results,
wherein the query results in each second cache are updated with the updated query results independently of the content of the second cache as a result of the re-computation orders issued by the computer system.

* * * * *